(12) United States Patent
Kurematsu

(10) Patent No.: US 6,712,473 B2  
(45) Date of Patent: Mar. 30, 2004

(54) MIRROR ARRAY DEVICE AND PROJECTION TYPE DISPLAY APPARATUS USING THE SAME

(75) Inventor: Katsumi Kurematsu, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/981,409

(22) Filed: Oct. 17, 2001

(65) Prior Publication Data

US 2002/0054276 A1 May 9, 2002

(51) Int. Cl.$^7$ .............. G03B 21/28; G01J 3/40; G02B 5/08; G02B 3/80; G02B 27/46
(52) U.S. Cl. .............. 353/99; 353/37; 359/563; 359/742; 359/846; 359/851; 359/872; 356/305; 356/328; 356/334
(58) Field of Search ................ 359/563, 742, 359/846, 851, 295, 872; 353/37, 98–99; 356/305, 328, 334; 348/771, 774

(56) References Cited

U.S. PATENT DOCUMENTS

| 5,469,302 A | | 11/1995 | Lim ............................ 359/846 |
| 5,481,396 A | * | 1/1996 | Ji et al. ...................... 359/295 |
| 5,661,611 A | * | 8/1997 | Kim et al. .................. 359/871 |
| 5,682,265 A | * | 10/1997 | Farn et al. ................. 359/571 |
| 5,760,947 A | * | 6/1998 | Kim et al. .................. 359/291 |
| 5,801,765 A | * | 9/1998 | Ogino ......................... 349/5 |
| 5,815,305 A | | 9/1998 | Min et al. ................... 359/292 |
| 6,188,529 B1 | * | 2/2001 | Koyama et al. ............ 359/738 |

FOREIGN PATENT DOCUMENTS

| JP | 8-21977 | 1/1996 |
| JP | 2000-137191 | 5/2000 |
| JP | 2000-330043 | 11/2000 |

* cited by examiner

Primary Examiner—Russell Adams
Assistant Examiner—Magda Cruz
(74) Attorney, Agent, or Firm—Morgan & Finnegan LLP (57) ABSTRACT

In order to provide a noise-free reliable projection type display apparatus which has no movable portion and can display a high quality full-color image, the following arrangement is proposed. In a projection type display apparatus which has an optical modulation device for displaying an image by controlling the reflected state of light, an illumination unit for irradiating the optical modulation device with light, and a projecting optical system for projecting reflected light components of the light components with which the optical modulation device is irradiated, and projects and displays an image formed by the optical modulation device, as the optical modulation device, a mirror array device for modulating light by controlling the tilt amounts of mirrors that form pixels is used. The mirror array device is illuminated with color light components from different directions, at least some of the reflected light components are guided into a projecting unit such as a projecting lens, and a predetermined image is projected and displayed on a target projection type display means such as a screen by the projecting unit.

21 Claims, 5 Drawing Sheets

PRIOR ART

MIRROR ARRAY DEVICE AND PROJECTION TYPE DISPLAY APPARATUS USING THE SAME

BACKGROUND OF THE INVENTION

1. Field of the Invention

The present invention relates to a projection type display apparatus and, more particularly, to a projection type display apparatus for displaying a full-color image on a display surface such as a screen using a mirror array device as optical modulation means.

2. Related Background Art

Along with the advent of the age of multimedia, image display apparatuses are used in every scene. Generally, display apparatuses for forming an image by modulating light are roughly classified into two types. One type is a direct viewing image type display apparatus such as a direct viewing CRT (Cathode Ray Tube) and direct viewing LCD, and the other type is a projection type display apparatus, including an LCD (Liquid Crystal Display), and a reflecting mirror device such as DMD (Deformable Mirror Device), or AMA (Actuated Mirror Array).

Since projection type display apparatuses can easily increase the screen size, front projectors for presentation or the like and rear projectors for a home theater or the like are becoming widely used. In such a projection type display apparatus using a liquid crystal panel or reflecting mirror device, the liquid crystal panel or reflecting mirror device serving as an optical modulation device is illuminated with light from a light source, and transmitted or reflected light is made incident on a screen or the like through a projecting optical system, thereby forming an image.

Although a direct viewing CRT is excellent in image quality, the weight and volume of the apparatus increase, and the manufacturing cost increases as the screen size increases. To the contrary, a projecting liquid crystal display apparatus can be made relatively thin, and the weight and volume can be reduced because its optical structure is simple. However, since an LCD normally uses linearly polarized light, the light utilization efficiency is as low as 1% to 5%. In addition, liquid crystal molecules respond slowly, and the liquid crystal layer is readily heated.

To solve the above problems, projection type display apparatuses using a reflecting mirror device such as a DMD or AMA have been developed. Currently, such projection type display apparatuses can obtain a light utilization efficiency of 5% to 10%. In addition, optical modulation is not affected by the polarization state of incident light and does not affect the polarization state of reflected light.

AMAs serving as reflecting mirror devices are roughly classified into a bulk type and a thin-film type. A bulk AMA is disclosed in U.S. Pat. No. 5,469,302 by Dae-Young Lim. To obtain the bulk AMA, a ceramic layer having a multi-layered structure is cut into a thin ceramic wafer with a metal electrode formed inside, the ceramic wafer is mounted on an active matrix incorporating a transistor, the resultant structure is fabricated by sawing, and a mirror is formed on it.

Figure 3:
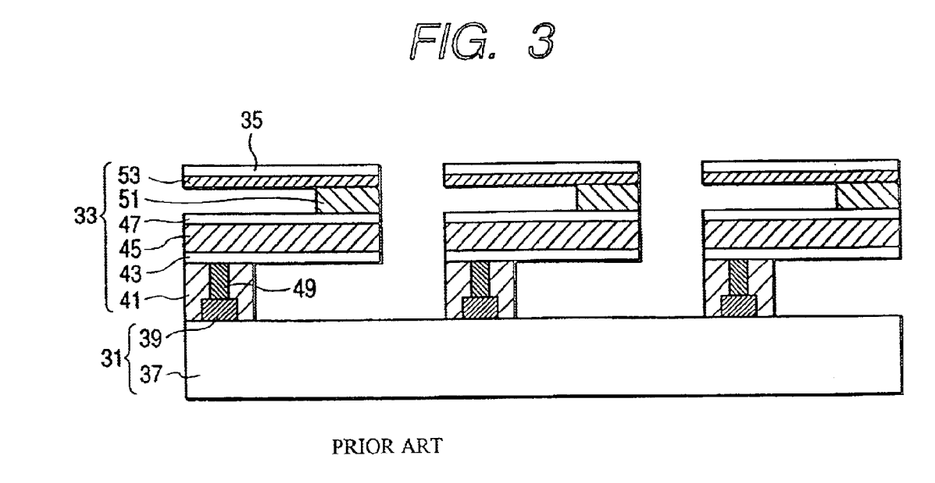
FIG. 3 is a sectional view showing the structure of a thin-film AMA.

As shown in FIG. 3, a thin-film AMA is disclosed in U.S. Pat. No. 5,815,305. Referring to FIG. 3, the thin-film AMA has an active matrix 31, an actuator 33 formed on the active matrix 31, and a mirror 35 formed on the actuator 33.

The active matrix 31 has a substrate 37, and M×N (M and N are positive integers) transistors (not shown) formed on the substrate 37, and M×N connection terminals 39 formed on the respective transistors.

The actuator 33 has a support portion 41 formed on the active matrix 31 and having the connection terminal 39, a first electrode 43 whose lower end on one side is attached to the support portion 41 and other side is formed in parallel to the active matrix 31, an interconnection or conductive tube 49 formed in the support portion 41 to connect the connection terminal 39 and first electrode 43, a deformable layer 45 formed on the first electrode 43, a second electrode 47 formed on the deformable layer 45, a spacing member 51 formed on one side of the second electrode 47, and a support layer 53 whose lower end on one side is attached to the spacing member 51 and other side is formed in parallel to the second electrode 47. The second electrode 47 is connected to the active matrix 31 by an interconnection (not shown). The mirror 35 is formed on the support layer 53.

When a predetermined electrical signal (voltage) corresponding to an image signal is applied to the first electrode 43 of each pixel through the active matrix 31, each pixel actuator 33 tilts by a predetermined angle, and accordingly, each pixel mirror 35 tilts.

Such a thin-film AMA is manufactured using semiconductor manufacturing processes. For this reason, the mirror array has a perfect quality so that light enough to display digital image with a high-luminance and high-contrast under normal indoor illumination conditions can be transmitted to the screen. In other words, a thin-film AMA is a reflection-type optical modulator using a thin-film piezoelectric actuator in relation to a microscopic mirror and has been developed to obtain a tilt angle enough to provide high contrast and a light utilization efficiency enough to provide high luminance. A thin-film AMA has also been developed to ensure uniformity in a large scale integration across 300,000 pixels of mirrors formed from a single pattern.

As for forming a projection type display apparatus using a reflecting mirror device such as a thin-film AMA or DMD, a typical arrangement is disclosed in, e.g., Japanese Patent Application Laid-open No. 8-21977. That is, white illumination light is time-divisionally color-separated by a rotary color filter, a reflecting mirror device is illuminated with each color light component, and reflected light is guided into or outside the aperture of a projecting lens in accordance with tilt drive of each pixel mirror, thereby obtaining a predetermined full-color projected image.

In the prior art disclosed in Japanese Patent Application Laid-open No. 8-21977 described above, however, in projecting a full-color image, the illumination system has at least a rotary filter, a rotary filter drive motor, and a rotary synchronized signal processing system for color separation, resulting in complex structure. Additionally, since the rotary filter, i.e., a section rotatably driven at a high speed of up to 10,000 rpm is present, the system has problem in vibration noise and reliability.

SUMMARY OF THE INVENTION

One aspect of the present invention is to provide a projection type display apparatus comprising:

a mirror array device having a plurality of tiltable pixel mirrors each having a diffraction grating on a surface to perform optical modulation by the plurality of pixel mirrors;

an illumination optical system for illuminating the mirror array device; and a projecting optical system for projecting reflected light from the mirror array device onto a projected surface.

An apparatus described above preferably has a feature that each pixel mirror is not tilted to display black on the projected surface.

An apparatus described above preferably has a feature that the tilt angle of each pixel mirror is maximized to display black on the projected surface.

An apparatus described above preferably has a feature that each pixel mirror is tilted by a predetermined angle to do display black on the projected surface.

An apparatus described above preferably has a feature that the projecting optical system has an aperture which shields, of the reflected light components from the mirror array device, a light component which is not to be projected onto the projected surface.

An apparatus described above preferably has a feature that a color to be displayed on the projected surface is switched by changing a tilt angle of each pixel mirror.

An apparatus described above preferably has a feature that a color to be displayed on the projected surface is switched between red, green, and blue by changing the tilt angle of each pixel mirror.

An apparatus described above preferably has a feature that
- tilt angles of the pixel mirrors have a plurality of angle ranges that do not overlap, and
- a color of light to be projected onto the projected surface is switched by switching the angle range of the tilt angle.

An apparatus described above preferably has a feature that
- tilt angles of the pixel mirrors have first, second, third, and fourth angle ranges that do not overlap,
- when the tilt angle falls within the first range, red is displayed on the projected surface,
- when the tilt angle falls within the second range, green is displayed on the projected surface,
- when the tilt angle falls within the third range, blue is displayed on the projected surface, and
- when the tilt angle falls within the fourth range, black is displayed on the projected surface.

An apparatus described above preferably has a feature that gray level display of each color is performed by changing the tilt angle of each pixel mirror within the first, second, and third angle ranges.

An apparatus described above preferably has a feature that gray level display of each color is performed by changing the tilt angle of each pixel mirror.

An apparatus described above preferably has a feature that color display of one pixel is performed by mixing the color light components from the pixel mirrors by time color mixing.

An apparatus described above preferably has a feature that color display of one pixel is performed by mixing the color light components from the plurality of pixel mirrors adjacent to each other.

An apparatus described above preferably has a feature that the diffraction grating is an echelon grating.

An apparatus described above preferably has a feature that in a section perpendicular to a rotational axis in tilting the pixel mirror, the diffraction grating has a staircase shape.

An apparatus described above preferably has a feature that a direction in which light diffracted by the pixel mirror is distributed and a tilt direction of the pixel mirror are in the same plane.

An apparatus described above preferably has a feature that each diffracted light of each color is deflected in a separation direction of each color light component diffracted by the pixel mirror by tilting the pixel mirror.

The other aspect of the present invention is to provide a mirror array device comprising a plurality of tiltable pixel mirrors each having a diffraction grating on a surface, wherein optical modulation is executed by the plurality of pixel mirrors.

A device described above preferably has a feature that the diffraction grating is an echelon grating.

A device described above preferably has a feature that a direction in which light diffracted by the pixel mirror is distributed and a tilt direction of the pixel mirror are in the same plane.

A device described above preferably has a feature that each diffracted light of each color is deflected in a separation direction of each color light component diffracted by the pixel mirror by tilting the pixel mirror.

DETAILED DESCRIPTION OF THE PREFERRED EMBODIMENTS

The embodiment of the present invention will be described below with reference to the accompanying drawings.

Figure 1:
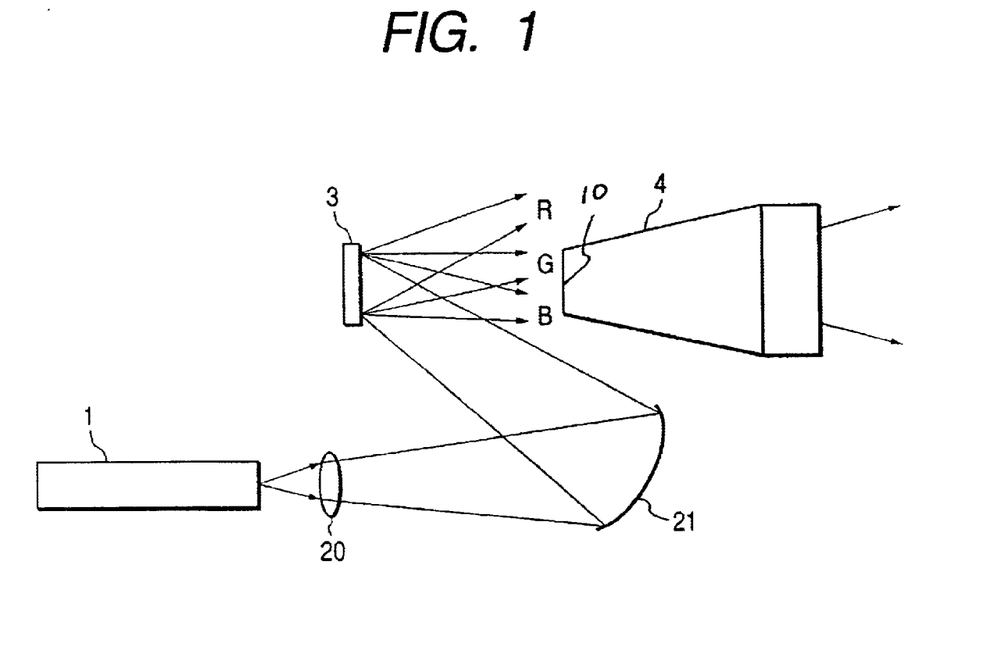
FIG. 1 is a view showing the system configuration of a projection type display apparatus according to the embodiment of the present invention.

As shown in FIG. 1, a projection type display apparatus of the present invention comprises a thin-film AMA 3 for displaying an image by controlling the reflecting direction of light for each pixel using a thin-film piezoelectric actuator, a white illumination unit 1 for irradiating the AMA 3 with white light, and a projecting optical system 4 for projecting the R (red), G (green), and B (blue) diffracted light components, i.e., reflected light components of light with which the AMA 3 is irradiated. With this arrangement, a full-color image is displayed on a screen.

Figure 2A:
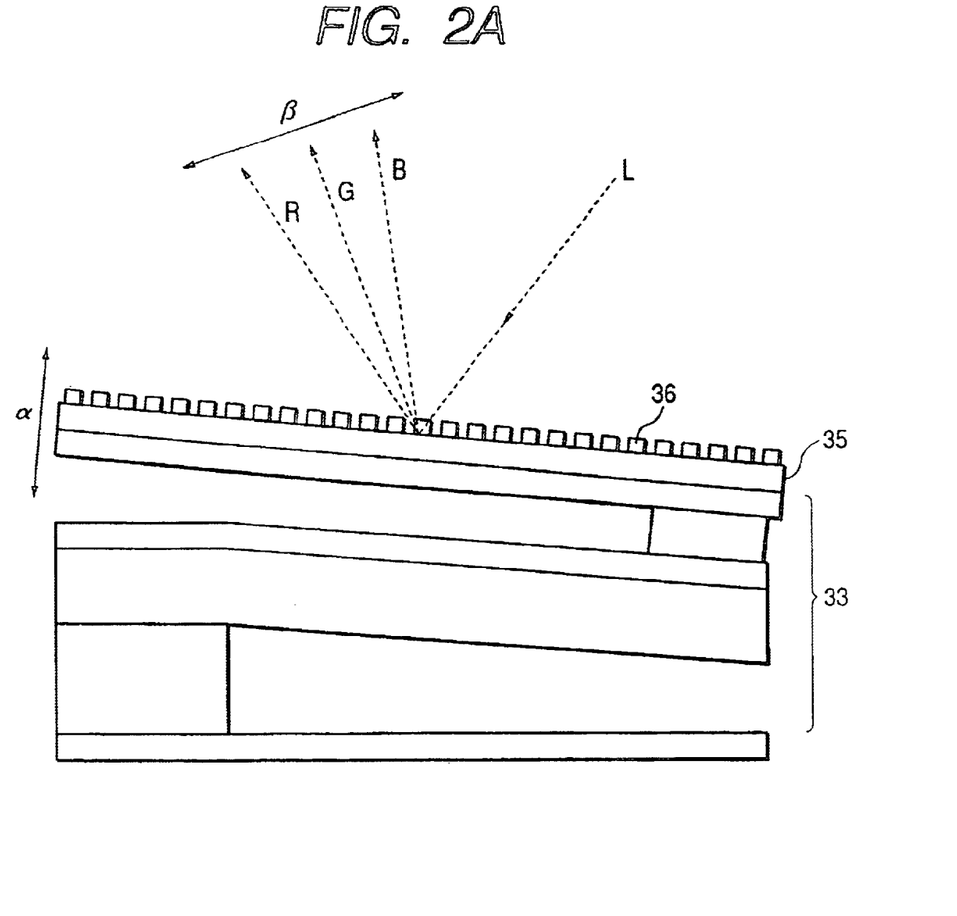
FIG. 2A is a sectional view for explaining the operation principle of reflected light color separation and reflection angle modulation in an AMA (Actuated Mirror Array) of the present invention.
Figure 2B:
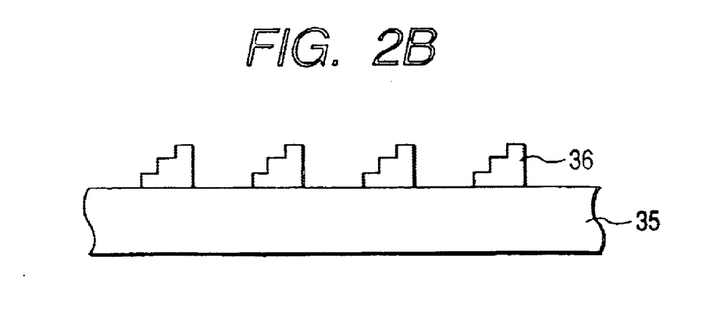
FIG. 2B is a sectional view of an echelon grating on a pixel mirror.
Figure 2C:
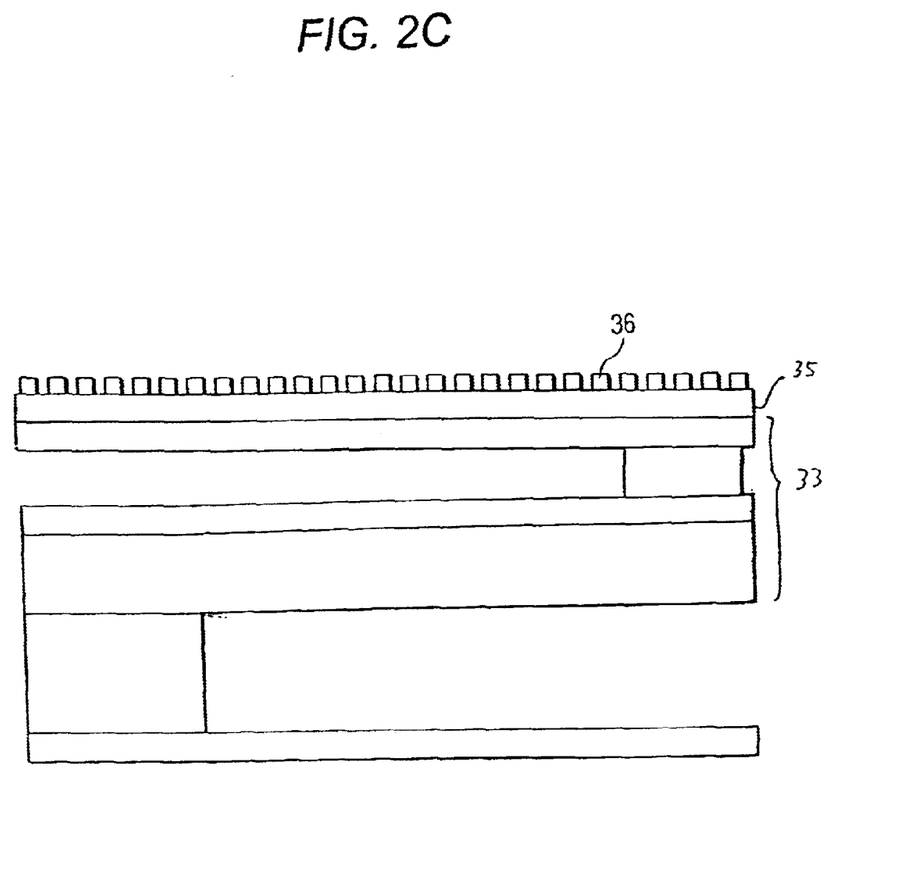
FIG. 2C is a sectional view showing the structure of an AMA of the present invention where a pixel mirror is not tilted.

In the thin-film AMA 3 used here, each pixel mirror 35 has on its surface a reflecting diffraction grating 36 formed by patterning using photolithography and deposition of a reflecting film, as shown in the enlarged view of FIG. 2A and FIG. 2C. For this diffraction grating 36, the lattice constant is 790 nm, the step difference in the grating is 135 nm, and the surface is an Al-deposited surface. For the pattern of the grating, the diffracted light distribution direction (i.e., the direction in which a diffraction grating has a staircase shape) β and the tilt drive direction of the mirror 35 are in the same plane, and here, in the drawing surface. That is, since the diffraction grating has a staircase shape in the surface (sheet surface) perpendicular to the rotational axis in tilting the thin-film AMA 3, diffracted light is separated in this drawing surface. Hence, the diffracted light components can be deflected in the separation direction of the R, G, and B diffracted light components by tilting the mirror 35.

The diffraction grating 36 is preferably made of a high-reflectance material or transparent material. If the reflectance or transmittance of the material of the diffraction grating 36 has an intermediate value, all the convex portions, concave portions, and side portions are coated with a high-reflectance material.

The diffraction grating may be the echelon grating 36 as shown in FIG. 2B. When the echelon grating 36 is used, the degree of separation of each color light component improves. Hence, in place of an He-Cd laser (to be described later), a tungsten lamp, metal halide lamp, halogen lamp, or high-pressure mercury lamp may be used as a light source.

As a video signal or monitor signal is applied to the piezoelectric actuator of each pixel mirror 35 of the AMA 3 at a predetermined timing, the pixel mirrors 35 in the AMA sequentially tilt by a predetermined amount.

Figure 5:
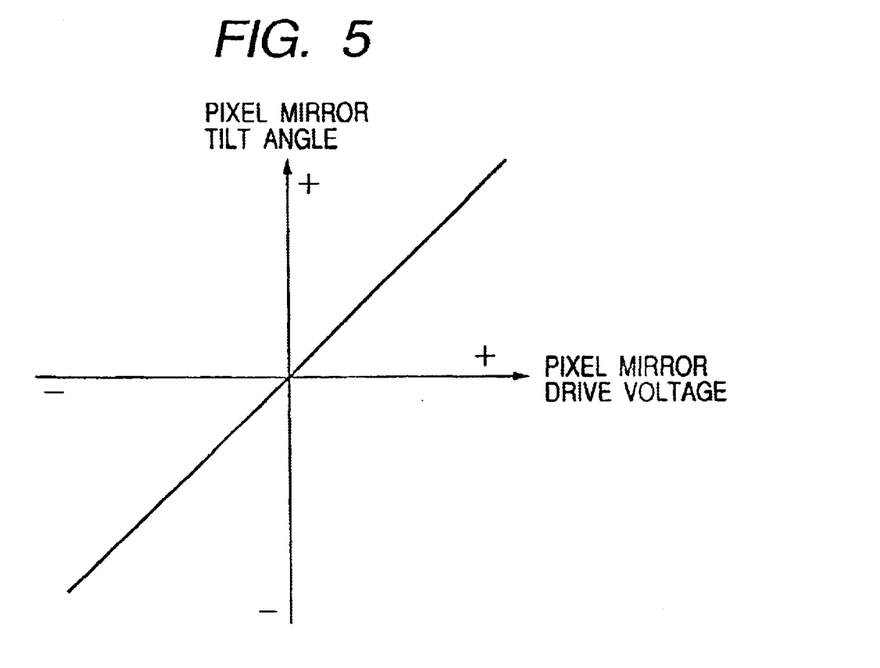
FIG. 5 is a graph showing the correlation between the pixel mirror tilt angle and the pixel drive voltage of the AMA pixel mirror.

FIG. 5 shows the relationship between the drive voltage applied to the pixel mirror actuator and the pixel mirror tilt angle generated at that time. As is apparent from FIG. 5, in the default state wherein no drive voltage is applied to the actuator, the pixel mirror does not tilt, and the tilt angle is 0. When a negative voltage is applied, the pixel mirror tilts in a direction reverse to that when a positive voltage is applied.

ON/OFF of the projected image is determined depending on whether a reflected light beam from each pixel enters the entrance aperture 10 of the projecting optical system 4, i.e., an aperture or the aperture of a member corresponding to an aperture. If the light beam is partially captured by the aperture, the gray level display of an image is determined by the degree of capture of each color light component.

The white illumination unit 1 is formed from an He-Cd laser having a plurality of oscillation wavelengths of 636 nm (R), 534 nm and 538 nm (G), and 442 nm (B) and a beam expander. An emitted light beam diverges by a predetermined amount.

White light containing R, G, and B color light components is emitted from the white illumination unit 1 as a divergent light beam, condensed by a collimator lens 20, and reaches a concave mirror 21. The light beam is condensed and reflected by the mirror 21 to illuminate the AMA 3 while converging, as shown in FIG. 1. The incident angle of the illumination optical axis with respect to the center of the AMA 3 is set to 20°. When each pixel mirror in the AMA 3 is in a predetermined still state, reflected light from the AMA 3 is affected by the function of the diffraction grating of each pixel mirror. For this reason, the respective color components are reflected at different angles, as shown in FIG. 1 and separated. At the entrance aperture 10 of the optical system 4, the reflected diffracted light components of R, G, and B are separated. The focal point of each of the R, G, and B light components separated by the concave mirror 21 can be either in front of or behind the entrance aperture. To obtain the gray level of each color, each condensing point is set at a position separated from the entrance aperture 10 to some extent such that the light beam has a predetermined size near the entrance aperture 10.

FIG. 2A shows the principle of color separation for one pixel mirror surface. The reflected light of white light beam L (more exactly, synthesized light of three, i.e., R, G, and B spectra) incident on the mirror 35 is affected by the diffraction function of the reflecting diffraction grating 36 formed on the mirror 35. The R, G, and B color light components are reflected in different directions so that the colors are separated. Higher-order light with a relatively low intensity is neglected here and is not illustrated. In this embodiment, the separation angle in the first-order diffraction direction of each color light component was about 8°. When the pixel mirror 35 is tilted by the voltage applied to a first electrode 43, as indicated by an arrow α, the reflected diffracted light components R, G, and B after color separation are deflected in an amount corresponding to the tilt amount of the pixel mirror 35, as indicated by an arrow β, and change their reflecting directions while keeping the color-separated states (more exactly, when the reflecting directions of the R, G, and B diffracted light components change, the separation angle between the R, G, and B light components also slightly changes).

Figure 4:
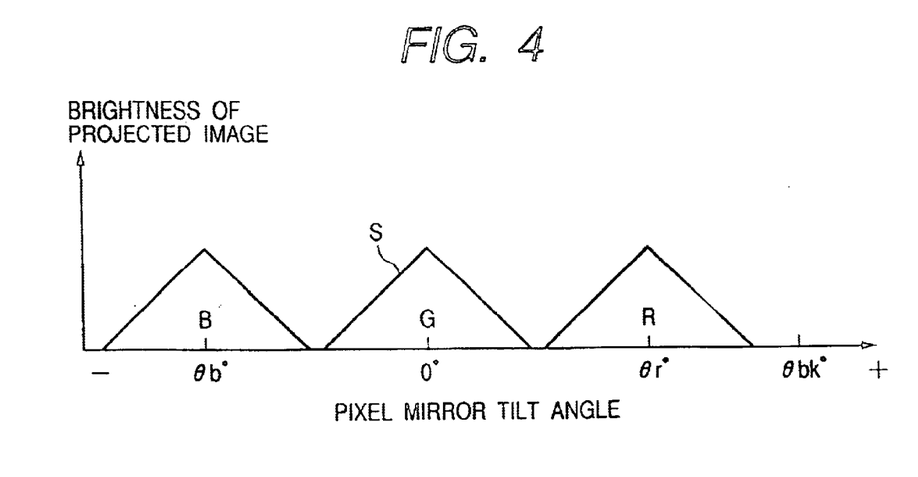
FIG. 4 is a graph showing the correlation between the AMA pixel mirror tilt angle and the brightness of a projected image.

Hence, when each pixel mirror 35 tilts (the direction of tilt matches the RGB light beam separation direction in FIG. 2A), the mirror tilt angle and the amount of the each exit light component from the projecting optical system 4 after passing through the entrance aperture 10, i.e., the brightness of the projected image have a relationship shown in FIG. 4. That is, as the mirror tilt angle changes from the negative direction (when a negative voltage is applied to the pixel mirror actuator) to the positive direction (when a positive voltage is applied to the pixel mirror actuator), a B light component gradually exits and switches to a G light component and then to an R light component. At the maximum tilt angle, all light components fall outside the aperture, and a state wherein no light exits (black display) can be obtained. The state wherein no light exits (black display) or little light exits can be obtained even at a tilt angle of 0°, i.e., even when no voltage is applied.

When the relationship between the pixel mirror tilt angle and the brightness of the projected image is used, gray level display of each color is possible. Referring to FIG. 4, the range near θb° where the B light component exits from the projecting optical system 4 is the angle range for blue display. The range near 0° (or θg°) where the G light component exits from the projecting optical system 4 is the angle range for green display. The range near θr° where the R light component exits from the projecting optical system 4 is the angle range for red display. The range near θbk° on the positive side of the angle range for red display is the angle range for black display, i.e., the range wherein no light exits from the projecting optical system 4.

Figure 6:
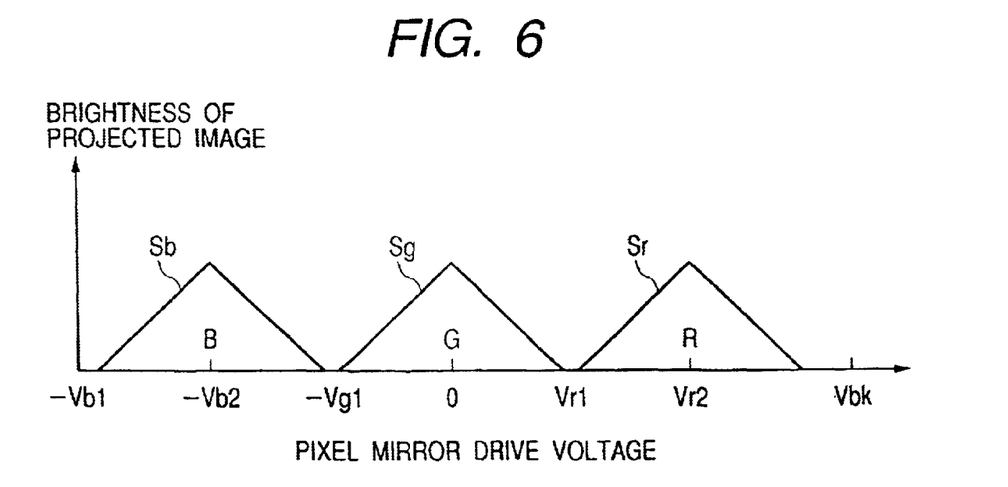
FIG. 6 is a graph showing the correlation between the brightness of a projected image and the pixel drive voltage of the AMA pixel mirror.

The pixel mirror tilt angle and the pixel mirror drive voltage have a proportional relationship, as shown in FIG. 5. Hence, the pixel mirror drive voltage and the brightness of the projected image have a relationship shown in FIG. 6, as is apparent from the above two relationships.

According to this embodiment, color switching and gray level display of each color light component can be done only by controlling the drive voltage to each pixel mirror. That is, gray level display of a B image is done using a gradient Sb (drive voltage is −Vb1 to −Vb2) in FIG. 6, gray level display of a G image is done using a gradient Sg (drive voltage is Vg1 to 0), and gray level display of an R image is done using a gradient Sr (drive voltage is Vr1 to Vr2). In addition, black display is done using a drive voltage Vbk.

In this embodiment, a full-color image may be displayed by a method of displaying primary color image frames on the projected surface (screen) in the order of RGBRGB . . . , i.e., time color mixing, or by a method of determining display colors for the respective pixels as a mosaic pattern and forming a pixel of the image to be projected on the projected surface (screen) using a plurality of pixel mirrors adjacent to each other, i.e., spatial color mixing. In the former case, although the number of frames per unit time is increased to three times or more the normal number of frames by high-speed drive, an image can be displayed at the original resolution of the AMA 3. In the latter case, the normal drive speed suffices. Additionally, in this embodiment, with the single hardware configuration, color reproduction (display) in different color mixing modes or switching between the modes can be easily performed only by changing the drive signal (voltage) to each pixel in the AMA 3. In the above-described time color mixing, images are displayed on the screen in the order of RGBRGB .... However, the order of colors is not limited to the above example. If necessary, images may be displayed in the order of RGBGRGB ..., i.e., the number of times of display of G images may be larger than that of R or B images. The number of times of display may be increased not for G images but for images of another color, or the number of times of display may be changed for each color image.

Furthermore, according to this embodiment, the tilt angles of the pixel mirrors are limited to only four angles: θr°, 0°, θb°, and θbk° in FIG. 4, and the pixel mirrors are driven only by four drive voltages corresponding to these angles. In this arrangement, pixel mirror tilt drive is used only for color switching including black display. For gray level display, high-speed drive is executed to multiply the frame frequency in the above two examples by the number of reproduced (displayed) gray levels such that a gray level is reproduced in time average by the number of times of display per unit time (digital time gray level), thereby achieving a full-color display. The tilt angles may be limited to three angles: −θ°, 0°, and +θ° to display black and two color light components. Alternatively, full-color display may be achieved by making three tilt angles correspond to red, green, and blue display, respectively, and preparing a separate light-shielding means for black display.

As described above, according to this embodiment, a full-color image can be projected and displayed using a single AMA without any movable portion such as a rotary color filter. Since no movable portion is present, a noise-free reliable projection type display apparatus having a simple so-called single AMA structure can be formed.

For the above-described embodiment, the following changes and modifications can be made.

(1) As the light source, a lamp is used in place of the laser. When a lamp for emitting white light is used, light from the lamp is guided to the concave mirror 21 or AMA 3 in FIG. 1 using an elliptical mirror, parabolic mirror, or lens.

(2) As the mirror device, a bulk AMA or DMD is used in place of the thin-film AMA.

(3) As the optical element, not the concave mirror but a convex lens is used. A plurality of convex lenses, or an optical unit having a positive refracting power as a whole, may be used.

(4) A rear projection type or front projection type projector is formed.

What is claimed is:

1. A projection type display apparatus comprising:

an illumination optical system for radiating illumination light;

a mirror array device for forming an image, which has an arrangement in which a plurality of tiltable pixel mirrors each having a diffraction grating on a surface thereof are arranged in an array, said mirror array device separating said illumination light from said illumination optical system to a plurality of color lights, and reflecting said plurality of color lights to the respective directions different from each others; and a projecting optical system for projecting reflected light which are reflected to predetermined directions among said plurality color lights reflected by said mirror array device.

2. An apparatus according to claim 1, wherein each pixel mirror is not tilted to display black on the projected surface.

3. An apparatus according to claim 1, wherein the tilt angle of each pixel mirror is maximized to display black on the projected surface.

4. An apparatus according to claim 1, wherein each pixel mirror is tilted by a predetermined angle to do display black on the projected surface.

5. An apparatus according to claim 1, wherein said projecting optical system has an aperture which shields, of the reflected light components from said mirror array device, a light component which is not to be projected onto the projected surface.

6. An apparatus according to claim 1, wherein a color to be displayed on the projected surface is switched by changing a tilt angle of each pixel mirror.

7. An apparatus according to claim 1, wherein a color to be displayed on the projected surface is switched between red, green, and blue by changing the tilt angle of each pixel mirror.

8. An apparatus according to claim 1, wherein tilt angles of the pixel mirrors have a plurality of angle ranges that do not overlap, and a color of light to be projected onto the projected surface is switched by switching the angle range of the tilt angle.

9. An apparatus according to claim 1, wherein tilt angles of the pixel mirrors have first, second, third, and fourth angle ranges that do not overlap, when the tilt angle falls within the first range, red is displayed on the projected surface, when the tilt angle falls within the second range, green is displayed on the projected surface, when the tilt angle falls within the third range, blue is displayed on the projected surface, and when the tilt angle falls within the fourth range, black is displayed on the projected surface.

10. An apparatus according to claim 9, wherein gray level display of each color is performed by changing the tilt angle of each pixel mirror within the first, second, or third angle ranges.

11. An apparatus according to claim 1, wherein gray level display of each color is performed by changing the tilt angle of each pixel mirror.

12. An apparatus according to claim 1, wherein color display of one pixel is performed by mixing the color light components from the pixel mirrors by time color mixing.

13. An apparatus according to claim 1, wherein color display of one pixel is performed by mixing the color light components from the plurality of pixel mirrors adjacent to each other.

14. An apparatus according to claim 1, wherein the diffraction grating is an echelon grating.

15. An apparatus according to claim 1, wherein in a section perpendicular to a rotational axis in tilting the pixel mirror, the diffraction grating has a staircase shape.

16. An apparatus according to claim 1, wherein a direction in which light diffracted by the pixel mirror is distributed and a tilt direction of the pixel mirror are in the same plane.

17. An apparatus according to claim 1, wherein each diffracted light of each color is deflected in a separation direction of each color light component diffracted by the pixel mirror by tilting the pixel mirror.

18. A mirror array device comprising:

a plurality of tiltable pixel mirrors each having a diffraction grating on each of surfaces thereof, and arranged in an array, wherein said mirror array device separates illumination light from an illumination optical system to a plurality of color lights, and reflects said plurality of color lights to the respective directions different from each others so as to from an image.

19. A device according to claim 18, wherein the diffraction grating is an echelon grating.

20. A device according to claim 18, wherein a direction in which light diffracted by said pixel mirror is distributed and a tilt direction of said pixel mirror are in the same plane.

21. A device according to claim 18, wherein each diffracted light of each color is deflected in a separation direction of each color light component diffracted by said pixel mirror by tilting the pixel mirror.

* * * * *

UNITED STATES PATENT AND TRADEMARK OFFICE
CERTIFICATE OF CORRECTION

PATENT NO. : 6,712,473 B2
DATED : March 30, 2004
INVENTOR(S) : Katsumi Kurematsu It is certified that error appears in the above-identified patent and that said Letters Patent is hereby corrected as shown below:

Column 8,
Line 7, please delete "directions" and substitute therefore -- direction --

Column 10,
Line 2, please delete "others" and substitute therefore -- other --

Signed and Sealed this

Nineteenth Day of April, 2005

JON W. DUDAS
*Director of the United States Patent and Trademark Office*

UNITED STATES PATENT AND TRADEMARK OFFICE
CERTIFICATE OF CORRECTION

PATENT NO. : 6,712,473 B2
DATED : March 30, 2004
INVENTOR(S) : Katsumi Kurematsu It is certified that error appears in the above-identified patent and that said Letters Patent is hereby corrected as shown below:

<u>Title page,</u>
Item [30], Foreign Application Priority Data, has been omitted and should read as follows:
 -- October 18, 2000 [JP] Japan ………………..2000-318138 --

Signed and Sealed this

Nineteenth Day of July, 2005

JON W. DUDAS
*Director of the United States Patent and Trademark Office*